(12) United States Patent
Gallagher et al.

(10) Patent No.: US 7,672,528 B2
(45) Date of Patent: Mar. 2, 2010

(54) METHOD OF PROCESSING AN IMAGE TO FORM AN IMAGE PYRAMID

(75) Inventors: Andrew C. Gallagher, Brockport, NY (US); Jeffrey C. Snyder, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 885 days.

(21) Appl. No.: 10/607,401

(22) Filed: Jun. 26, 2003

(65) Prior Publication Data

US 2004/0264799 A1    Dec. 30, 2004

(51) Int. Cl.
G06K 9/42 (2006.01)
G06K 9/46 (2006.01)
G06K 9/40 (2006.01)

(52) U.S. Cl. .................. 382/256; 382/240; 382/260

(58) Field of Classification Search ............. 382/265, 382/141, 356, 240, 260
See application file for complete search history.

(56) References Cited

U.S. PATENT DOCUMENTS

| | | | |
|---|---|---|---|
| 5,012,333 A | | 4/1991 | Lee et al. |
| 5,148,497 A | * | 9/1992 | Pentland et al. ............. 382/249 |
| 5,359,674 A | * | 10/1994 | van der Wal ................ 382/261 |
| 5,467,404 A | | 11/1995 | Vuylsteke et al. |
| 5,471,987 A | | 12/1995 | Nakazawa et al. |
| 5,687,258 A | * | 11/1997 | Kaplan ....................... 382/268 |
| 5,717,791 A | | 2/1998 | Labaere et al. |
| 5,805,721 A | | 9/1998 | Vuylsteke et al. |
| 5,822,453 A | | 10/1998 | Lee et al. |
| 5,907,642 A | | 5/1999 | Ito |
| 5,991,457 A | * | 11/1999 | Ito et al. .................... 382/254 |
| 6,005,983 A | * | 12/1999 | Anderson et al. ........... 382/254 |
| 6,122,017 A | * | 9/2000 | Taubman .................... 348/620 |
| 6,128,578 A | * | 10/2000 | Sakaino et al. ................ 702/3 |
| 6,141,459 A | * | 10/2000 | Gendel ....................... 382/256 |
| 6,219,464 B1 | * | 4/2001 | Greggain et al. ............ 382/298 |
| 6,285,798 B1 | | 9/2001 | Lee |
| 6,317,521 B1 | | 11/2001 | Gallagher et al. |
| 6,580,837 B1 | * | 6/2003 | Johnson ...................... 382/300 |
| 6,654,504 B2 | * | 11/2003 | Lubin et al. ................. 382/254 |

(Continued)

OTHER PUBLICATIONS

Burt et al, The Laplacian Pyramid as a Compact Image Code, Apr. 1983, IEEE.*

(Continued)

*Primary Examiner*—Bhavesh M Mehta
*Assistant Examiner*—Kathleen S Yuan
(74) *Attorney, Agent, or Firm*—Thomas H. Close

(57) ABSTRACT

A method of processing an image to form an image pyramid having multiple image levels includes receiving a base level image comprising pixel values at pixel locations arranged in rows and columns; determining sample locations for a next level image in the pyramid such that the sample locations are arranged in a regular pattern and the sample locations exceed the range of the pixel locations of the base level image; determining the pixel values of the next level image by interpolating the pixel values of the base level image using an interpolation filter at the sample locations; and treating the next level image as the base level image and repeating steps of determining sample locations and pixel values until a predetermined number of pyramid image levels are generated, or until a predetermined condition is met.

20 Claims, 10 Drawing Sheets

U.S. PATENT DOCUMENTS

| | | | |
|---|---|---|---|
| 6,757,442 B1 * | 6/2004 | Avinash | 382/274 |
| 6,760,487 B1 * | 7/2004 | Linares | 382/275 |
| 6,833,839 B2 * | 12/2004 | Nair et al. | 345/602 |
| 7,321,400 B1 * | 1/2008 | Chou et al. | 348/616 |
| 2004/0028271 A1 * | 2/2004 | Pollard et al. | 382/162 |
| 2004/0086201 A1 * | 5/2004 | Muresan et al. | 382/300 |
| 2004/0101207 A1 * | 5/2004 | Langan | 382/274 |

OTHER PUBLICATIONS

U.S. Appl. No. 10/294,860 by Gallagher et al., filed Nov. 14, 2002.

* cited by examiner

METHOD OF PROCESSING AN IMAGE TO FORM AN IMAGE PYRAMID

FIELD OF INVENTION

The present invention relates to an improved method of generating an image pyramid and to a method of spatially filtering a digital image using the image pyramid.

BACKGROUND OF THE INVENTION

It is well known that the dynamic range of an image captured with an image capture device (such as a photographic negative) is often greater than the dynamic range of the output medium (such as a photographic paper or CRT monitor). The result of this incongruity is that a good deal of scene content is lost in the output image. For this reason, in an image processing environment, a tone scale function may be used to reduce the scene dynamic range in order to map more information onto the output medium, in a process called dynamic range modification or dynamic range compression. The dynamic range compression modifies the tone scale characteristics of the image.

There exist many processes for creating a tone scale function on an image dependent basis; e.g. see U.S. Pat. No. 5,471,987 issued Dec. 5, 1995 to Nakazawa et al. Each of the conventional tone scale function processes examines certain statistical characteristics of the image under consideration in order to automatically generate the tone scale function. In addition, the tone scale function may be generated with manual interactive tools by a human operator.

After the tone scale function has been generated, there exists the question of how to apply the tone scale function to the digital image. The goal of dynamic range compression is to adjust the overall dynamic range of the image, rather than to affect the contrast of any given object in the image. In essence, a tone scale function should be applied to an image in such a way as to minimize the effect to the scene texture. To that end, it is known to apply a tone scale function to a low frequency sub-band of the image, preserving the higher frequency sub-band(s) that are considered image texture; e.g. see U.S. Pat. No. 5,012,333 issued Apr. 30, 1991 to Lee et al.

Lee et al. describe a procedure for preserving the high frequency detail of an image by blurring the image neutral channel in order to create a low-pass signal. Subtracting the low-pass signal from the image neutral channel produces a high-pass signal. The processed image is generated by applying the tone scale function to the low-pass signal and adding the result to the high-pass signal. This procedure preserves a segment of the image frequency spectrum; however, artifacts are generated at object boundaries in the image. Gallagher et al. build on this work; see U.S. Pat. No. 6,317,521 issued Nov. 13, 2001. More specifically, Gallagher et al. incorporate an artifact avoidance scheme along with a single standard FIR filter to generate the texture signal. While this improvement reduces the occurrence of artifacts in the final image, the artifacts can still be visible.

Several methods for achieving dynamic range modification of an image by decomposing the image into multiple resolutions have been proposed. For example, in U.S. Pat. No. 5,467,404 issued Nov. 14, 1995, and U.S. Pat. No. 5,805,721 issued Sep. 8, 1988, Vuylsteke et al. teach a method of decomposing an image into a pyramid having multiple resolution versions of the image and using a pre-determined nonlinear amplitude compression function for the high frequency component in each resolution. A deficiency of this method is that the amplitude at each resolution does not adequately identify whether the signal is part of a large amplitude edge or an image texture. A similar approach was disclosed in U.S. Pat. No. 5,717,791 issued Feb. 10, 1998 to Labaere et al., which describes a similar dynamic range compression scheme using an image pyramid generated using wavelet filters to generate the multiple resolutions.

In U.S. Pat. No. 5,907,642 issued May 25, 1999, Ito describes a method of image enhancement based on processing the detail signals of an image pyramid. Ito describes suppressing the magnitude of detail signals in situations where the next lower detail signal has small magnitude. In U.S. Pat. No. 5,991,457 issued Nov. 23, 1999, Ito describes a method of generating several band pass detail image signals that are modified by application of non-linear functions to modify the dynamic range of the image.

In U.S. Pat. No. 6,285,798 B1 issued Sep. 4, 2001, Lee describes yet another dynamic range compression method using a pyramid representation of an image. Lee describes a method of using wavelet filters to create a plurality of coarse signals and detail signals, modifying the detail signals in accordance with contrast gain signals created by detecting the edges of the coarse scale edges, and adding the modified detail signals to the coarse signals to obtain an output image.

In each of these dynamic range compression techniques using a pyramid image representation, the high frequency (e.g. edge or band pass) components of the pyramid image representation are modified to affect the image dynamic range. However, it is often inconvenient to operate on the high frequency component of the pyramid image representation. In addition, the characteristics of the high frequency signals vary as a function of the level within the pyramid image representation. This variability requires a complicated parameter tuning in order to achieve optimal dynamic range compression without producing objectionable artifacts (such as the aforementioned overshoot and undershoot artifact) using a pyramid representation of the image.

Pyramid methods as a means of representing images as a function of spatial resolution for image processing, has a long history. Burt and Adelson, described a method of representing a digital image by a series of residual images and a base digital image in their journal article "The Laplacian Pyramid as a Compact Image Code" IEEE Transactions on Communications, Vol. Com-31, No. 4, Apr. 1983. However the method taught by Burt et al. was designed for image compression applications and cannot be used for enhancing the tone scale of a digital image.

The prior art methods described for handing the borders of an image pyramid are inefficient. Vuylsteke, LaBaere, and Ito each describe generating lower resolution base image pyramid levels by filtering then sampling every other pixel. This method throws away image information whenever the image has an even number of rows, as the samples of the lower resolution base image span (cover) all but one of the image rows. In addition, the sampling method does not preserve phase between the resolution levels. For example, consider an 8×8 pixel image. Omitting the blurring filter, after 4 pyramid levels have been generated, the image is represented as a single pixel. The value of the single pixel is the same as the pixel of the 8×8 image in the upper left position (assuming sampling of every other pixel.) Thus a phase shift of several pixels has occurred. Because of this phase shift, the pyramids used by Vuylsteke, Labaere and Ito are sub-optimal.

In addition, Gendel describes an image pyramid in U.S. Pat. No. 6,141,459, issued Oct. 31, 2000. Gendel describes a method of forming an image pyramid to handle the image borders so that a smoothing filter will provide valid results. However, Gendel's solution of padding the image is inefficient and the method does not ensure that image information is not lost due to the span of the lower resolution base image being smaller than the starting base image.

Therefore, there exists a need for an improved method of forming image pyramids and in particular an improved method for processing image pyramid borders. Specifically, there is a need to improve the method of processing image pyramid borders when using an image pyramid to modify the tone scale of a digital image.

SUMMARY OF THE INVENTION

The need is met according to the present invention by providing a method of processing an image to form an image pyramid having multiple image levels that includes receiving a base level image comprising pixel values at pixel locations arranged in rows and columns; determining sample locations for a next level image in the pyramid such that the sample locations are arranged in a regular pattern and the sample locations exceed the range of the pixel locations of the base level image; determining the pixel values of the next level image by interpolating the pixel values of the base level image using an interpolation filter at the sample locations; and treating the next level image as the base level image and repeating steps of determining sample locations and pixel values until a predetermined number of pyramid image levels are generated, or until a predetermined condition is met.

Advantages

The present invention has the advantages of computational efficiency and ensures that image information is not lost due to the span of the lower resolution base image being smaller than the starting base image.

DETAILED DESCRIPTION OF THE INVENTION

In the following description, a preferred embodiment of the present invention will be described as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

Figure 1:
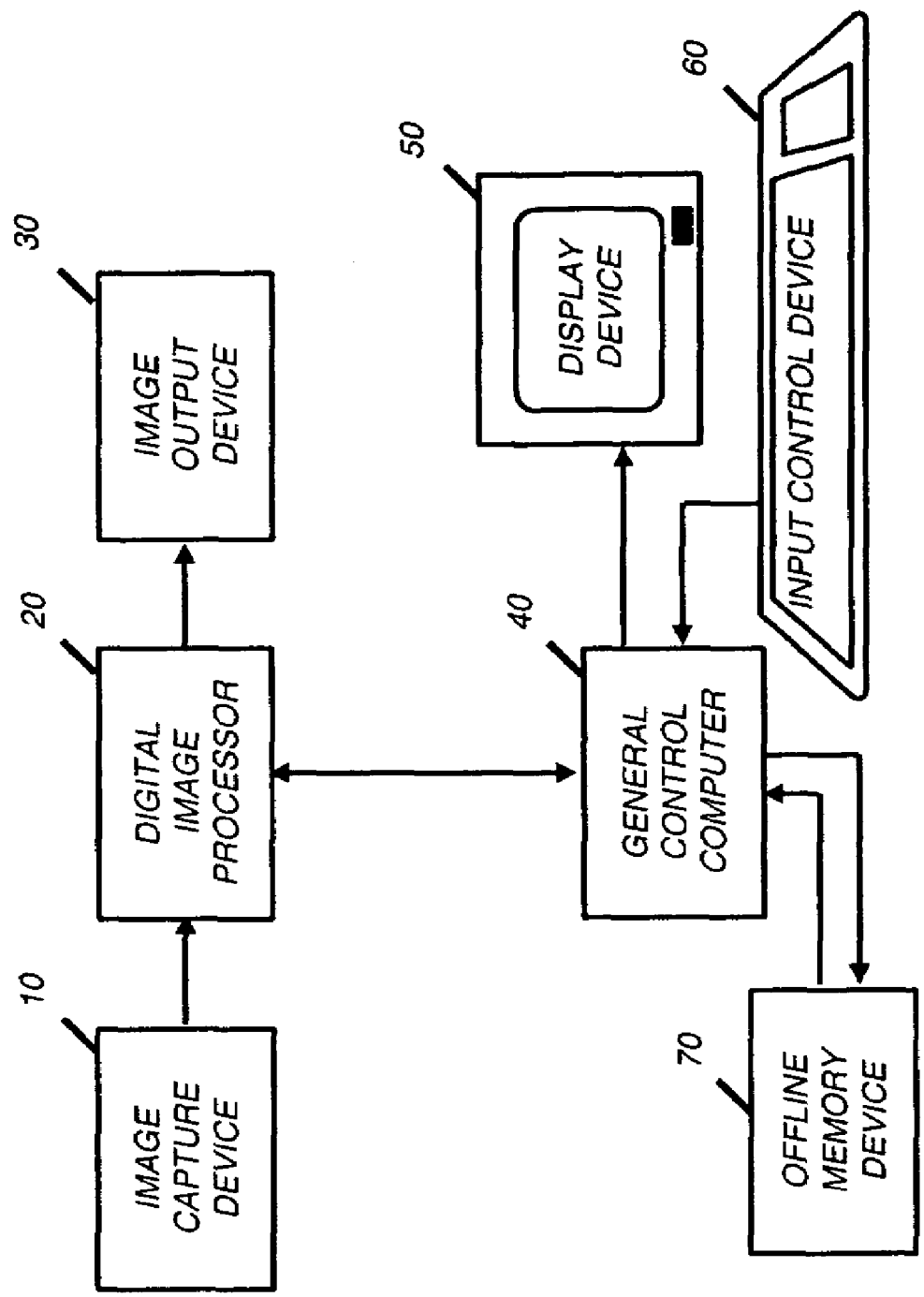
FIG. 1 is a block diagram of a computer system suitable for practicing the present invention.

The present invention may be implemented in computer hardware. Referring to FIG. 1, the following description relates to a digital imaging system which includes an image capture device 10, a digital image processor 20, an image output device 30, and a general control computer 40. The system can include a display device 50 such as a computer console or paper printer. The system can also include an input control device 60 for an operator such as a keyboard and or mouse pointer. The present invention can be used on multiple capture devices 10 that produce digital images. For example, FIG. 1 can represent a digital photofinishing system where the image capture device 10 is a conventional photographic film camera for capturing a scene on color negative or reversal film, and a film scanner device for scanning the developed image on the film and producing a digital image. The digital image processor 20 provides the means for processing the digital images to produce pleasing looking images on the intended output device or media. The present invention can be used with a variety of output devices 30 that can include, but are not limited to, a digital photographic printer and soft copy display. The digital image processor 20 can be used to process digital images to make adjustments for overall brightness, tone scale, image structure, etc. of digital images in a manner such that a pleasing looking image is produced by an image output device 30. Those skilled in the art will recognize that the present invention is not limited to just these mentioned image processing functions.

The general control computer 40 shown in FIG. 1 can store the present invention as a computer program stored in a computer readable storage medium, which may comprise, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention may also be stored on any other physical device or medium employed to store a computer program indicated by offline memory device 70. Before describing the present invention, it facilitates understanding to note that the present invention is preferably utilized on any well-known computer system, such as a personal computer.

It should also be noted that the present invention can be implemented in a combination of software and/or hardware and is not limited to devices which are physically connected and/or located within the same physical location. One or more of the devices illustrated in FIG. 1 may be located remotely and may be connected via a wireless connection.

A digital image is comprised of one or more digital image channels. Each digital image channel is comprised of a two-dimensional array of pixels. Each pixel value relates to the amount of light received by the imaging capture device corresponding to the physical region of pixel. For color imaging applications, a digital image will often consist of red, green, and blue digital image channels. Motion imaging applications can be thought of as a sequence of digital images. Those skilled in the art will recognize that the present invention can be applied to, but is not limited to, a digital image channel for any of the above mentioned applications. Although a digital image channel is described as a two dimensional array of pixel values arranged by rows and columns, those skilled in the art will recognize that the present invention can be applied to non rectilinear arrays with equal effect. Those skilled in the art will also recognize that for digital image processing steps described hereinbelow as replacing original pixel values with processed pixel values is functionally equivalent to describing the same processing steps as generating a new digital image with the processed pixel values while retaining the original pixel values.

There are many different types of tone scale functions that can be applied to digital images for enhancement purposes. Some digital images are derived from original scenes photographed that have a high dynamic range of intensities present. In general, it is difficult to make pleasing prints from these high dynamic range digital images since the range of pixel values is so large. For a typical high dynamic range digital image, the image content in the highlight regions (bright portions) and shadow regions (dark portions) will often be rendered without detail since photographic paper can only reproduce faithfully a limited range of intensities. Therefore, a compressive tone scale function, i.e. a tone scale function designed to compress, or reduce, the dynamic range of a digital image, can be applied to a high dynamic range digital image to reduce the numerical range of pixel values. This processed digital image when printed, will reproduce more spatial detail in the highlight and shadow regions than if the tone scale function had not been applied. Unfortunately, the application of a compressive tone scale function can also compress, or reduce the magnitude of, the fine spatial detail of the image content. Therefore, the processed images with the direct application of a tone scale function can result in dull uninteresting images.

According to one aspect of the present invention a spatial filter is used to apply a tone scale function to a digital image. The spatial filter is used to separate an original digital image into first and second signals: a pedestal signal and a texture signal. The texture signal contains image content that relates to edges and fine spatial detail. A tone scale function is applied to the pedestal signal. Since the pedestal signal does not contain fine spatial detail, but rather low frequency smoothly varying regions and edges from illumination changes, the application of the tone scale function to the pedestal signal does not reduce the magnitude of the fine spatial detail. The fine spatial detail is preserved in the texture signal, which is recombined with the processed pedestal part. The resulting process achieves the goal of reducing the overall dynamic range of the image to be within the printable range for the photographic paper (or other output medium, such as a CRT monitor) but doesn't reduce the magnitude of fine detail in the processed image.

Figure 2:
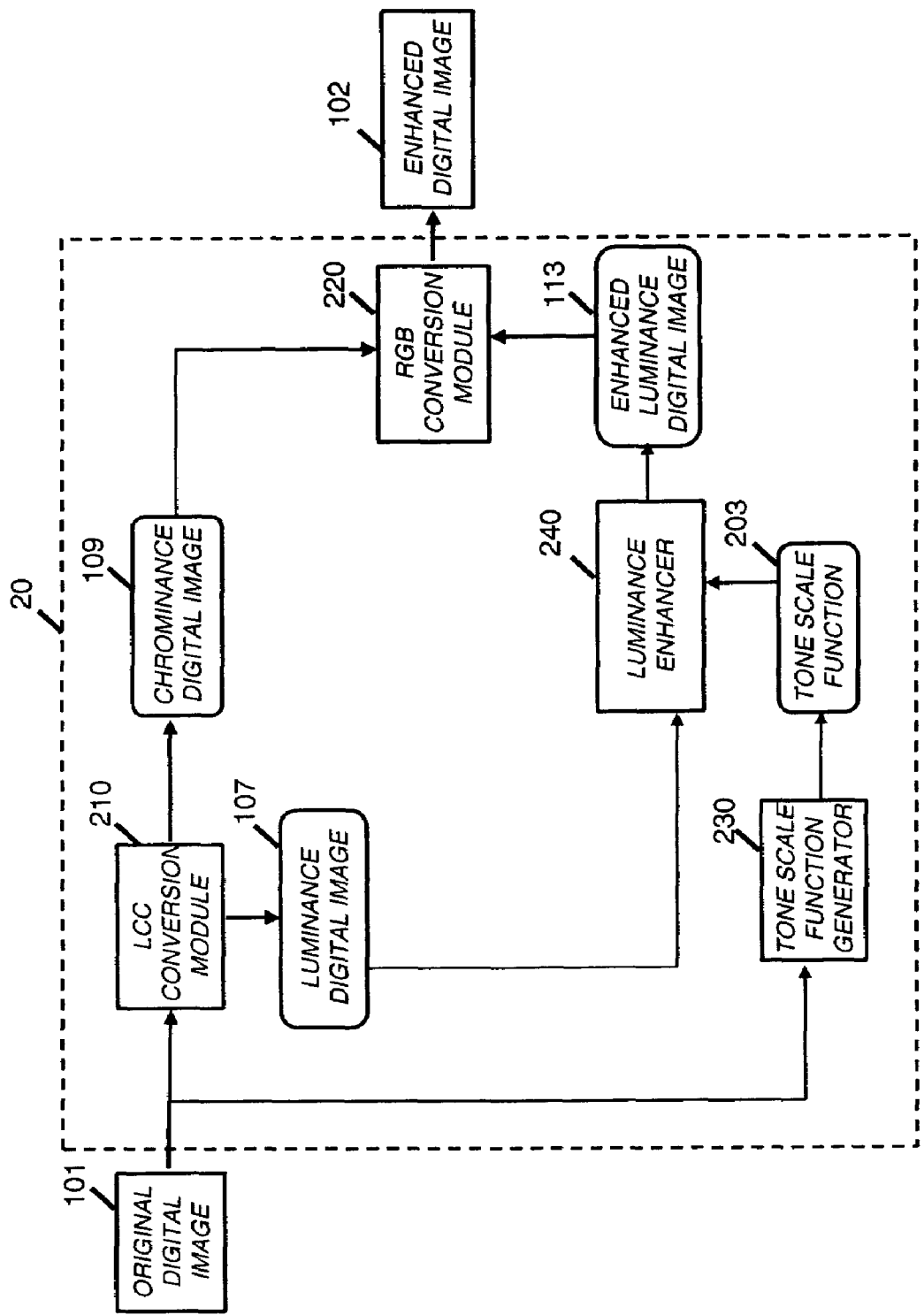
FIG. 2 is a block diagram of the digital image processor of FIG. 1 according to the present invention.

The digital image processor 20 shown in FIG. 1 and programmed to perform one aspect of the present invention is illustrated in more detail in FIG. 2. An original digital image 101 can be received from the image capture device (shown in FIG. 1) in a variety of different color representations. However, the most typical implementation of the present invention receives the original digital image as a color digital image with red, green, and blue digital image channels. Preferably, the pixel values of the original digital image are related to the log of the scene intensity and each pixel value of each color channel is represented as a 12-bit value. Preferably, every 188 code values represents a doubling of scene intensity (i.e. a photographic stop). For example, a first pixel having a value of 1688 represents a scene intensity that is twice as great as a second pixel having a value of 1500. The present invention can operate successfully with other encodings, although modification to equation constants and shapes of functions may be required.

An LCC conversion module 210 receives the original digital image 101 and generates a luminance digital image 107 (containing luminance information in a single digital image channel) and a chrominance digital image 109 (containing the color information in two color-difference digital image channels). The luminance digital image 107 is input to the luminance enhancer 240 for the purpose of creating an enhanced luminance digital image 113. The chrominance digital image 109 is input to the chroma control signal generator 112 for the purpose of creating a chroma control signal 114, which will be used to modify the effect of a spatial filter 116 within the luminance enhancer 240. The tone scale generator 230 inputs the original digital image 101 and analyzes the image, outputting a tone scale function 203 that is used by the luminance enhancer to improve the tone scale of the digital image. The chrominance digital image 109 and enhanced luminance digital image 113 are received by the RGB conversion module 220 which performs a color transformation and generates the enhanced digital image 102 (containing red, green, and blue digital image channels) which is in the same color representation as the original digital image 101. The enhanced luminance digital image 113 is produced from the luminance digital image 107 and the tone scale function 203.

The LCC module 210 shown in FIG. 2 preferably employs a 3 element by 3 element matrix transformation to convert the red, green, and blue pixel values of the original digital image 101 into luminance and chrominance pixel values. Let R(x,y), G(x,y), and B(x,y) refer to the pixel values corresponding to the red, green, and blue digital image channels located at the $x^{th}$ row and $y^{th}$ column. Let L(x,y), GM(x,y), and ILL(x,y) refer to the transformed luminance, first chrominance, and second chrominance pixel values respectively of an LCC original digital image. The 3 element by 3 elements of the matrix transformation are described by (1).

$$L(x,y)=0.333R(x,y)+0.333G(x,y)+0.333B(x,y)$$

$$GM(x,y)=-0.25R(x,y)+0.50G(x,y)-0.25B(x,y)$$

$$ILL(x,y)=-0.50R(x,y)+0.50B(x,y) \quad (1)$$

Those skilled in the art will recognize that the exact values used for coefficients in the luminance/chrominance matrix transformation may be altered and still yield substantially the same effect.

The collection of luminance pixel values is the single-channel luminance digital image. The chrominance digital image has two channels, the green-magenta channel (whose values are GM(x,y)) and the illuminant channel (whose values are ILL(x,y)). The luminance digital image is made up of luminance pixel values and the chrominance digital image is made up of chrominance pixel values.

The RGB conversion module 220 shown in FIG. 2 employs a 3 element by 3 element matrix transformation to convert the luminance and chrominance pixel values into red, green, and blue pixel values by performing the inverse matrix operation to the LCC module 210. The matrix elements of the RGB module are given by (2).

$$R(x,y)=L(x,y)-0.666GM(x,y)-ILL(x,y)$$

$$G(x,y)=L(x,y)+1.333GM(x,y)$$

$$B(x,y)=L(x,y)-0.666GM(x,y)+ILL(x,y) \quad (2)$$

The tone scale function generator 230 (shown in FIG. 2) preferably generates the tone scale function by an analysis of the original digital image 101. Preferably the tone scale function generator 230 incorporates the method described by Lee et al. in U.S. Pat. No. 5,822,453, issued Oct. 13, 1998, which is incorporated herein by reference, to calculate and output the tone scale function 203.

The present invention can also be used with tone scale functions that are not derived from an analysis of the original digital image 101, i.e. scene independent tone scale functions. For example, a linear tone scale function constructed as $T_5(x)=0.6\ (x-x_r)+x_r$ has been implemented and used as the tone scale function 203 yielding excellent image enhancement results. This tone scale function achieves a dynamic range compression effect due the linear equation having a slope of less than 1.0.

Figure 3:
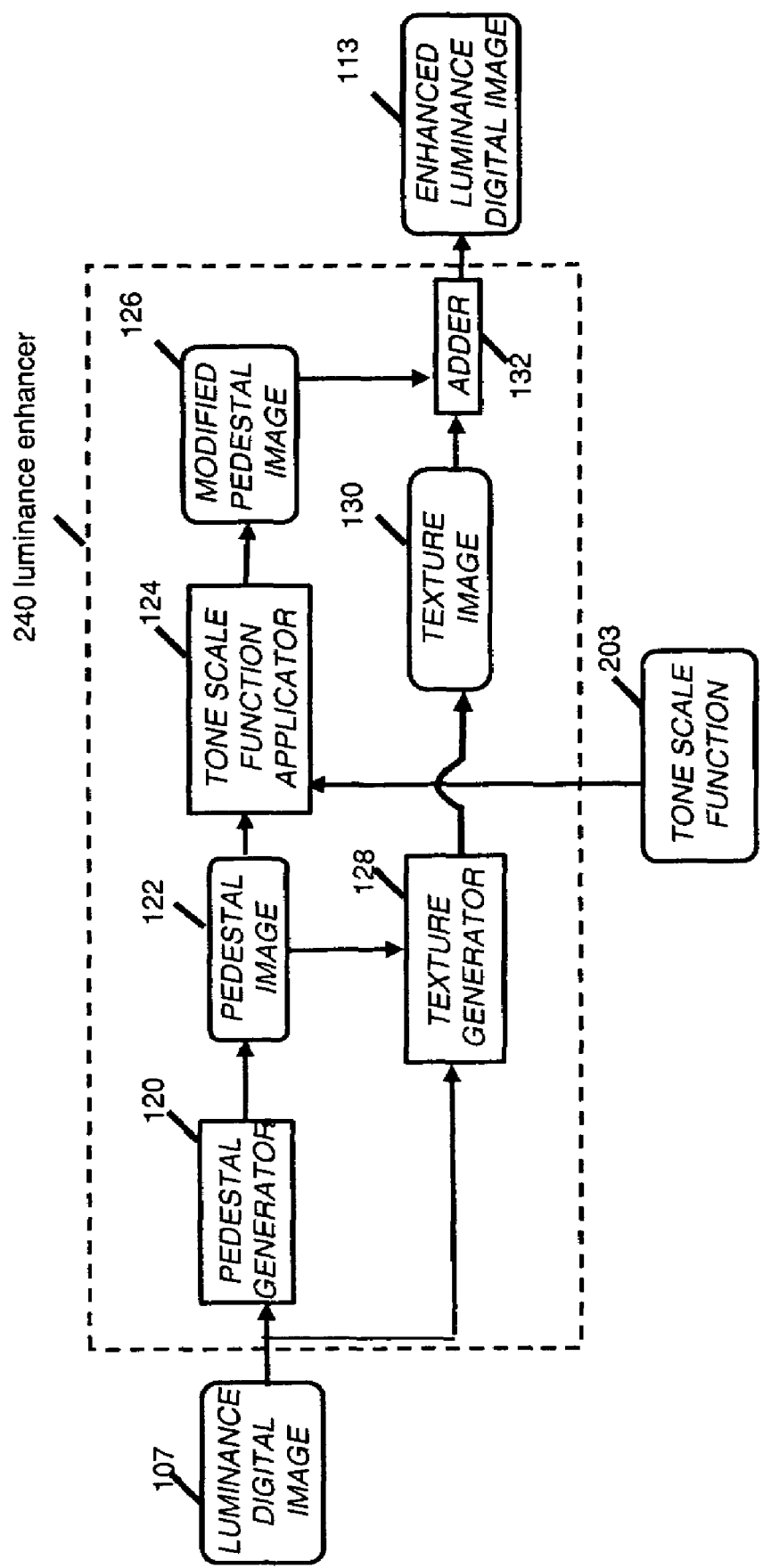
FIG. 3 is a block diagram of the luminance enhancer shown in FIG. 2.

The luminance enhancer 240 is illustrated in more detail in FIG. 3. The luminance digital image 107 is input to the pedestal generator 120 for producing a pedestal signal 122. The pedestal image 122 is essentially identical to the luminance digital image 107, with the exception that image texture is removed (i.e. texture that would be damaged if affected by the tone scale function). Ideally, the pedestal image 122 is smooth with sharp transitions corresponding to large lighting edges (such as the transition from a bright sky to a backlit mountain, or the edge of a high contrast shadow) in the luminance digital image. Preferably, the pedestal signal p(x, y) is made up of the same number of rows and columns of pixels as the luminance digital image 107. The pedestal generator 120 will be described in greater detail hereinbelow.

The pedestal image 122 and the luminance digital image 107 are input to a texture generator 128 for producing a texture image 130. The texture image contains the image texture whose magnitude will be unaffected by the tone scale function. The texture generator 128 generates the texture image 130 according to the following equation:

$$t(x,y)=L(x,y)-p(x,y) \quad (3)$$

where:

L(x,y) represents the value of the pixel of the luminance digital image at the (x,y) location.

p(x,y) represents the value of the pedestal image at the (x,y) location.

t(x,y) represents the value of the texture image at the (x,y) location.

Note that the sum of the pedestal and the texture images is the luminance digital image.

The pedestal image is input to the tone scale function applicator 124, which produces the modified pedestal image pm(x,y). The tone scale function applicator 124 produces the modified pedestal image 126 according to the equation:

$$pm(x,y)=T[p(x,y)] \quad (4)$$

where:

pm(x,y) represents the value of the (x,y) the pixel of the modified pedestal image pm(x,y).

T[x] represents the value of the tone scale function 203 for an input value of x. Those skilled in the art will recognize that the tone scale applicator 124 simply applies a look-up-table (LUT) to the pedestal signal, producing the modified pedestal image 126.

The modified pedestal image 126 and the texture image 130 are then added by an adder 132, producing the enhanced luminance digital image 113. The adder 132 generates the enhanced luminance digital image simply by summing the pixel values of the texture image and the modified pedestal image 126, according to the equation:

$$Le(x,y)=pm(x,y)+t(x,y) \quad (5)$$

Where:

Le(x,y) represents the value of the pixel of the enhanced luminance digital image 113 at the (x,y) location.

pm(x,y) represents the value of the (x,y) pixel of the modified pedestal image 126 pm(x,y).

t(x,y) represents the value of the (x,y) the pixel of the texture image 130 t(x,y).

Figure 4:
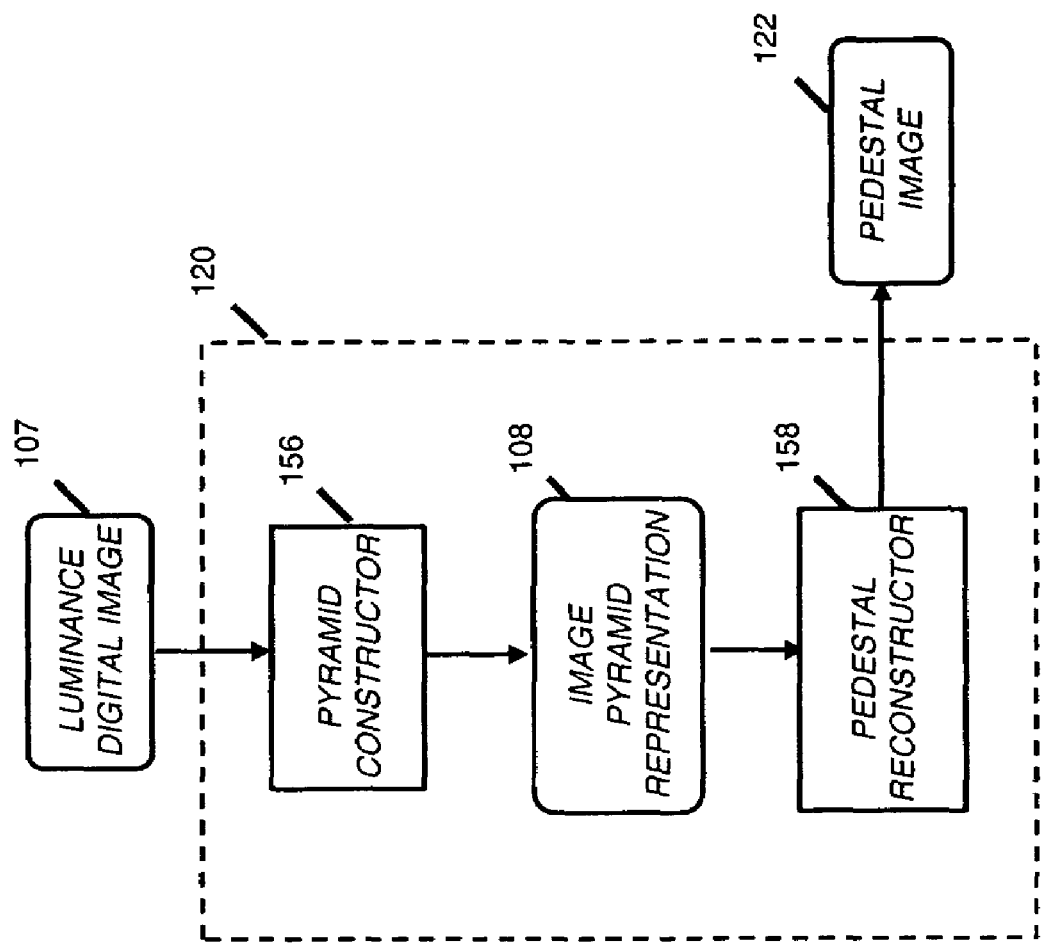
FIG. 4 is a block diagram of a preferred pedestal image generator shown in FIG. 3.

The preferred embodiment of the pedestal generator 120 is shown in FIG. 4, where a pyramid representation of the image is used so that the produced pedestal image 122 is a result of removing texture information at many different scales. The luminance digital image 107 is input to the pyramid constructor 156, which outputs an image pyramid representation 108. The image pyramid representation 108 contains all of the information that is contained in the luminance digital image 107, and the image pyramid representation 108 can be easily converted back to the luminance digital image 107. The image pyramid representation 108 includes several image signals, including the base digital image, which is essentially a smaller (fewer pixels) version of the luminance digital image 107, and residual images, which contain highpass information from different scales (i.e. the residual images contain bandpass information.) The pyramid representation 108 is input to the pedestal reconstructor 158, which combines the image signals of the image pyramid representation 108 in such a manner that the texture information is removed, forming the pedestal image 122.

Figure 5:
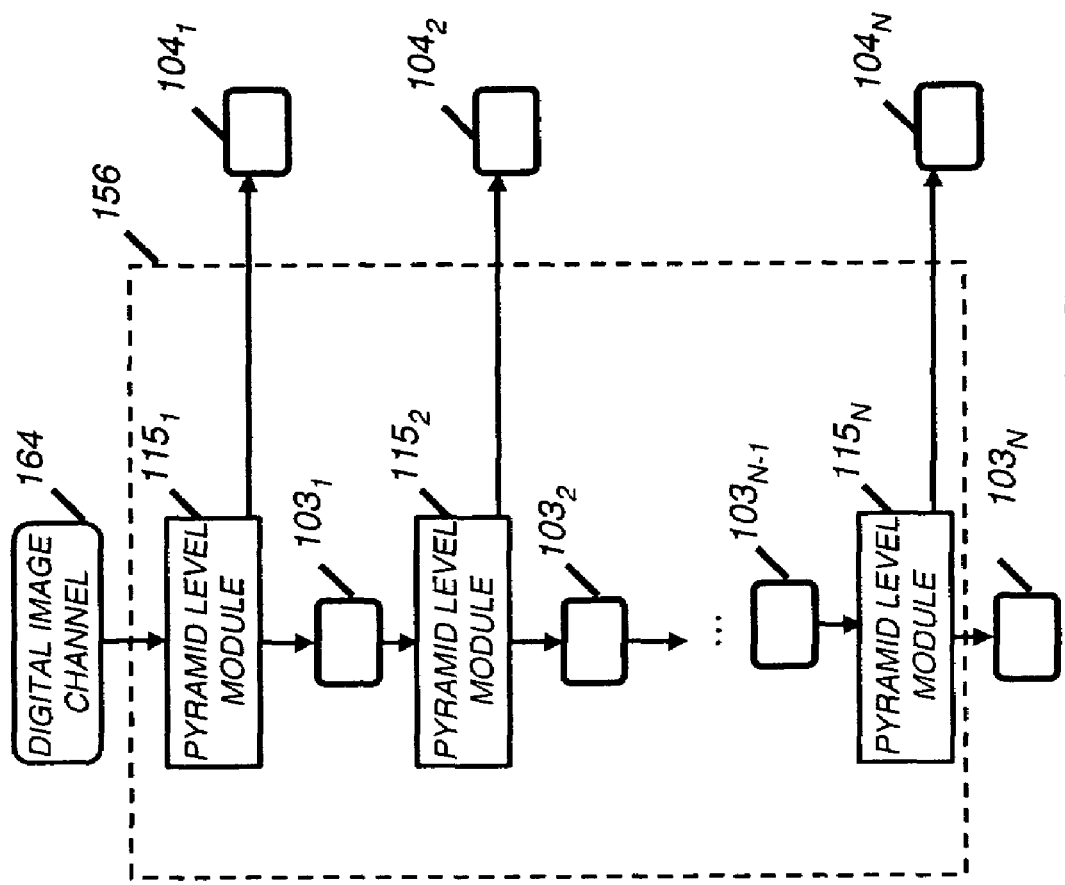
FIG. 5 is a block diagram of the pyramid constructor shown in FIG. 4.

The pyramid constructor 156 according to one aspect of the invention is illustrated in more detail in FIG. 5. A digital image 164 is input to the pyramid level module $115_1$. The pyramid level module 115 produces a first base digital image $103_1$ and residual digital image $104_1$. The residual digital image preferably has the same number of rows and columns of pixels as the digital image 164. The number of rows and columns of the base image $103_1$ is related to (and fewer than) the number of rows and columns of pixels of the digital image 164 and the decimation factor Q. Preferably Q=2. The base image level $103_1$ produced by the first pyramid level module $115_1$ is input to the second pyramid level module $115_2$, producing a second base image level $103_2$ and a second residual image $104_2$. The process iteratively continues N times, when the final pyramid level module $115_N$ inputs the N-$1^{th}$ base image level and produces the $N^{th}$ base image level $103_N$ and the $N^{th}$ residual image $104_N$. The digital image is also a base image level, so the pyramid level module always inputs a digital image. The digital image input to the first pyramid level module can be considered the $0^{th}$ base image level.

Figure 6:
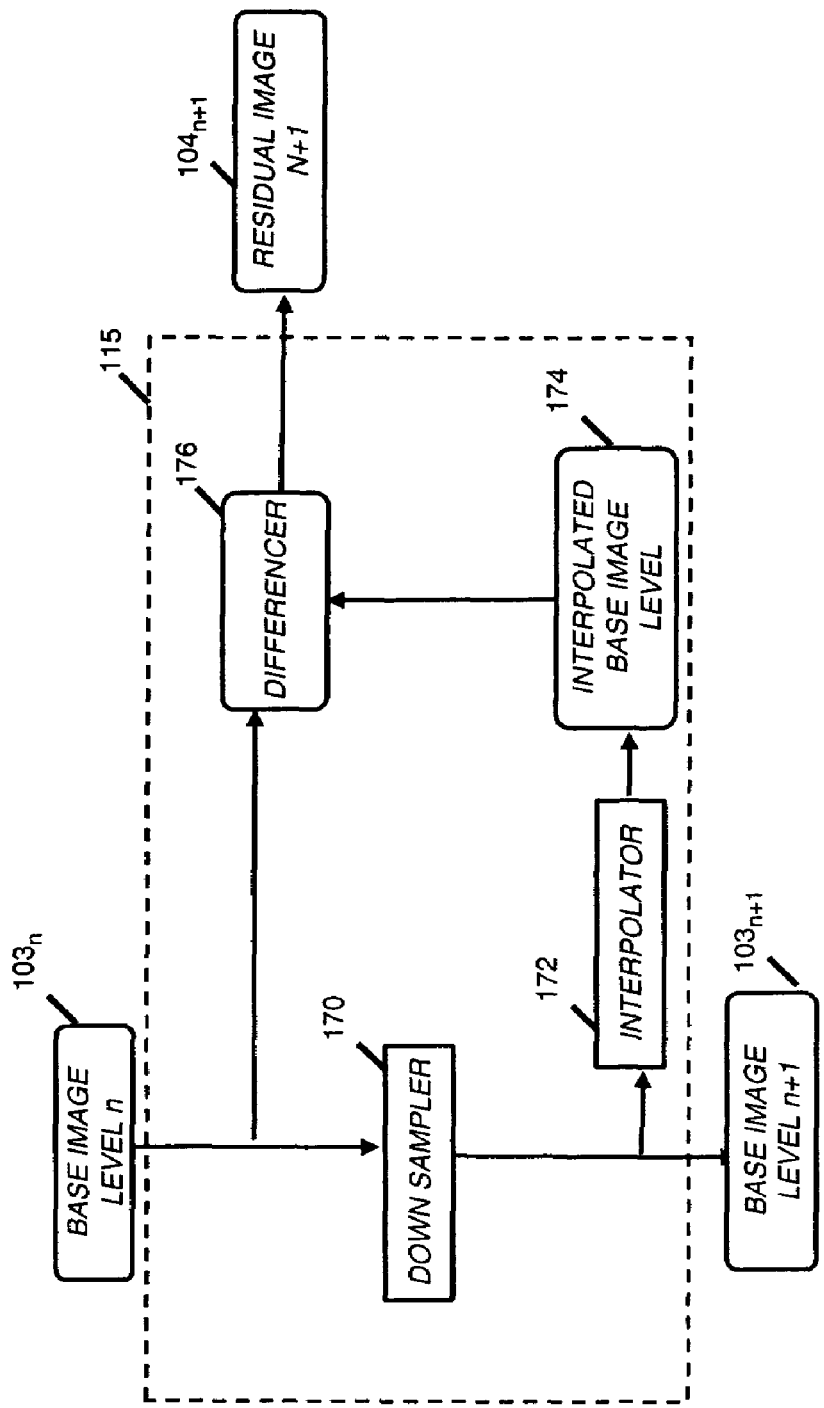
FIG. 6 is a block diagram of the pyramid level module shown in FIG. 5.

FIG. 6 fully illustrates the pyramid level module 115. The $n^{th}$ base image level $103_n$ is input to a down sampler 170 for producing the n+$1^{th}$ base image level $103_{n+1}$ The down sampler 170 produces a new digital image level whereby each pixel value of the new digital image level is formed by performing a weighted average (e.g. with a convolution filter) of the pixel values of the $n^{th}$ base image level $103_n$. Preferably, the pixel values of the n+$1^{th}$ base image level $103_{n+1}$ are determined as the mean pixel value of corresponding Q×Q non-overlapping blocks in the $n^{th}$ base image level $103_n$. This technique for reducing the resolution of an image by an integer factor is well known in the art of image processing, as is applying a lowpass convolution filter followed by a sampling operation.

Proper handling of the border pixels in the pyramid constructor 156 is quite important, for reasons of computational efficiency as well as image quality. Padding the base image level is inefficient because new memory must be allocated. The down sampler 170 generates a lower resolution base image level $103_{n+1}$ from an input base image level $103_n$. Let $I_0(x_0, y_0)$ represent the pixel values of the input base image level $103_n$ with $X_0$ rows and $Y_0$ columns of pixels, where $x_0$ is an integer over the range from 0 to $X_0-1$, and $y_0$ is an integer ranging from 0 to $Y_0-1$. Also, let $I_1(xi, yj)$ represent the pixel values of the n+1$^{th}$ base image level $103_{n+1}$ with $X_1$ rows and $Y_1$ columns of pixels, where $x_1$ is an integer over the range from 0 to $X_1-1$, and $y_1$ is an integer ranging from 0 to $Y_1-1$.

The lower resolution base image level $103_{n+1}$ generally has fewer pixels in both the horizontal and vertical directions than the base image level $103_n$. However, the area of the scene corresponding to each pixel is larger. In addition, it is preferable that the span of (scene area covered by) the lower resolution base image level $103_{n+1}$ be at least as large as that of the base image level $103_n$ to avoid the need to extrapolate beyond the range of the pixel location during the process executed by the interpolator 172.

The operation of the down sampler 170 can be thought of as finding the values of the lower resolution base image level $103_{n+1}$ $I_1(x_1, y_1)$ based on the values of the base image level $103_n$ $I_0(x_0, y_0)$. This is accomplished with the following steps:

A. The pixel locations $(x_1, y_1)$ of the lower resolution base image level $103_{n+1}$ are mapped back to sample locations $(\tilde{x}_0, \tilde{y}_0)$ in the base image level $103_n$. Typically, sample locations $(\tilde{x}_0, \tilde{y}_0)$ will not correspond to an exact integer location, but will fall between pixel sites.

Preferably, the mapping is given as:

$$\tilde{x}_0 = x_1 Q + \text{offset}$$

$$\tilde{y}_0 = y_1 Q + \text{offset} \quad (6)$$

The sample locations $(\tilde{x}_0, \tilde{y}_0)$ are arranged in a regular pattern (a grid with distance of Q between adjacent samples). The minimum value of $\tilde{x}_0$ is not greater than zero and the maximum value of $\tilde{x}_0$ is not less than $X_0-1$. Likewise, the minimum value of $\tilde{y}_0$ is not greater than zero and the maximum value of $\tilde{y}_0$ is not less than $Y_0-1$. Thus, the sample locations $(\tilde{x}_0, \tilde{y}_0)$ span the entire range of the pixel locations of the base image level $103_n$.

Preferably, Q is an integer indicating the distance between samples in the base image level $103n$. The offset in Eq. (6) is used to ensure that the span of the mapped pixel locations $(\tilde{x}_0, \tilde{y}_0)$ is equal to or greater than the span of the pixel locations of the base image level $103n$. In addition, the offset ensures that phase is preserved between resolution levels. The span is the distance between the maximum and the minimum for each image dimension. Preferably, offset=0 when Q is odd and offset=-½ when Q is even.

As stated before, the lower resolution base image level $103_{n+1}$ has $X_1$ rows and $Y_1$ columns of pixels. The value $X_1$ is found such that when the value $X_1-1$ is mapped back according to Eq. (6), it is at least as great as the value of $X_0-1$. A similar procedure can be used to determine $Y_1$.

Figure 7:
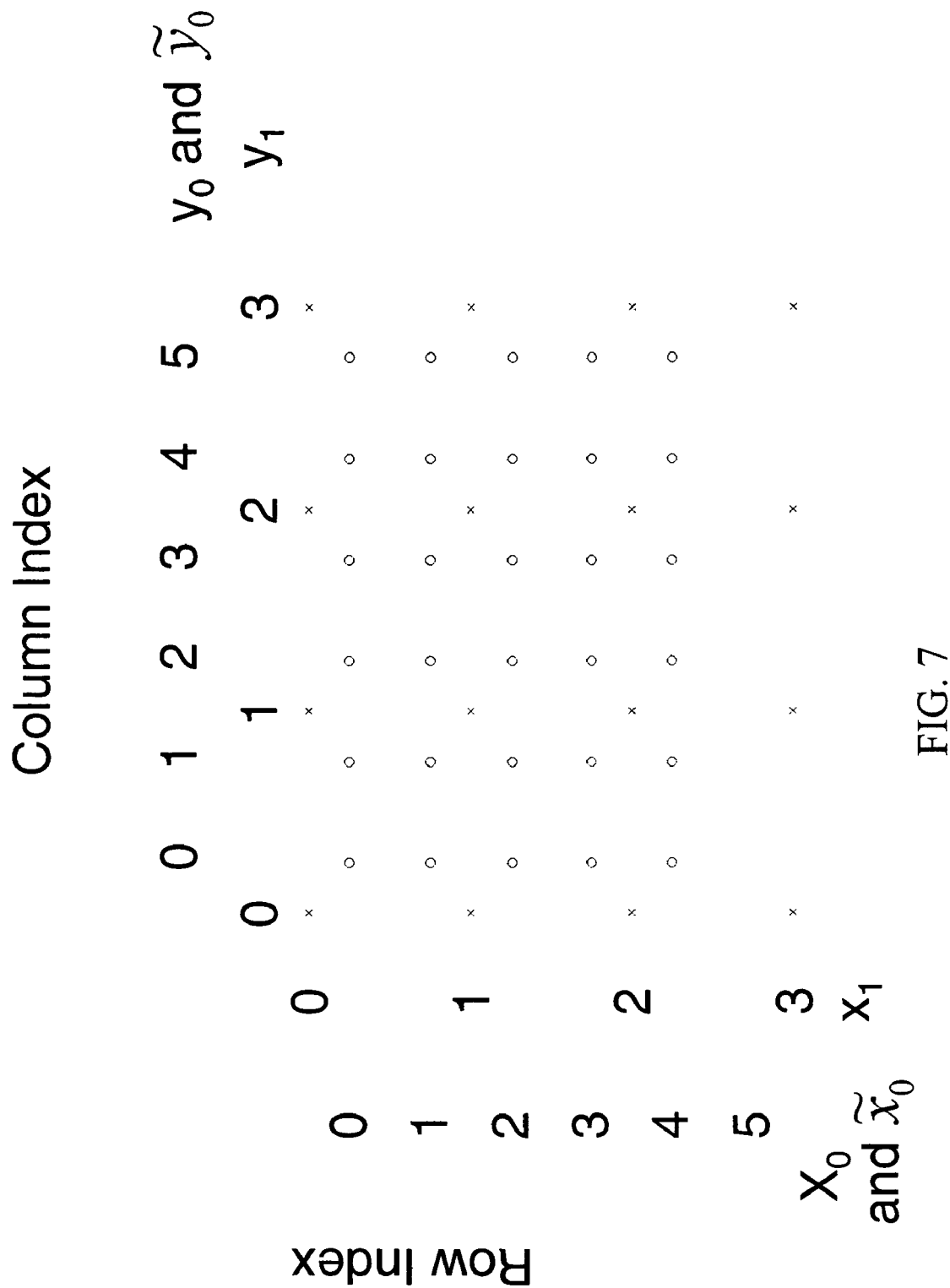
FIG. 7 is an illustration of the pixel locations in a base image level relative to the pixel locations of a lower resolution base image level.

Considering the preferred case where Q=2. The base image level $103_n$ has $X_0$ rows. If $X_0$ is even, then the lower resolution base image level $103_{n+1}$ will have $X_1 = X_0/2+1$ rows, according to the technique described above. If $X_0$ is odd, then the lower resolution base image level $103_{n+1}$ will have $X_1 = (X_0+1)/2+1$ rows. The number of columns in the lower resolution base image can similarly be determined. FIG. 7 shows an illustration of the pixel locations of the base image level $103_n$, and the sample locations.

More generally, when Q is even, if Q evenly divides into $X_0$, then the lower resolution base image will have $X_1 = X_0/Q+1$ rows. Otherwise, the lower resolution base image level will have $X_1 = \text{int}(X_0/Q)+2$ rows, where the int( ) function returns the largest integer not greater than the argument.

When Q is odd, if Q evenly divides into $X_0-1$, then the lower resolution base image will have $X_1 = (X_0-1)/Q+1$ rows. Otherwise, the lower resolution base image level will have $X_1 = \text{int}((X_0-1)/Q)+2$ rows.

B. The value of the pixel $I_1(x_1, y_1)$ is determined by interpolating between the pixel values nearby $I_0(\tilde{x}_0, \tilde{y}_0)$ (the sample location). This type of interpolation is well known in the art of image processing and can be accomplished by nearest neighbor interpolation, bilinear interpolation, bicubic interpolation, or any number of other interpolation methods. This interpolation can be expressed as a convolution operation, according to the following equation:

$$I_1(x_1, y_1) = \sum_{\substack{i=-\infty \\ j=-\infty}}^{+\infty} f_d(i, j) I_0(\tilde{x}_0 - i, \tilde{y}_0 - j) \quad (7)$$

where $f_d(i,j)$ is the smoothing filter. Note that $I_0$ is nonzero only when indices are integers. The shape and size of the smoothing filter can depend on the decimation factor Q. In the preferred case where Q=2, the preferred filter is defined as:

$$f_d(i,j) = 1 - |i| - |j| + |ij| \text{ for } |i|, |j| < 1, \text{ and 0 elsewhere.} \quad (8)$$

This is a bilinear filter commonly known in the art. When Q=2 and the mapping of Eq. (6) is used, then the smoothing filter performs block averaging, where each pixel in the lower resolution base image $103_{n+1}$ is created by averaging 2×2 pixel blocks of the base image level $103_n$.

Border conditions must be handled when the indices of Eq. (7) are outside of the range of the image $I_0(x_0, y_0)$. The preferred method of determining a value for equation when the indices of the image are outside of the span of the image is to use mirroring, described in Eq. (9).

By definition, $$I_0(m,n) = I_0(-m,n) \text{ when } m<0$$

$$I_0(m,n) = I_0(2X_0-m-2, n) \text{ when } m>X_0-1 \quad (9)$$

Although Eq. (9) shows mirroring in only the rows of the image, the mirroring is handled in an identical fashion for the image columns. Those skilled in the art will recognize that many obvious mirroring variations can by devised.

FIG. 7 shows an example of the pixel and sample locations for an illustrative base image level having 5 rows and 6 columns. The pixel locations of the base image level $103_n$ are indicated by small circles. The lower resolution base image level $103_{n+1}$ has 4 rows and 4 columns. The sample locations are found with Eq. (6), and are indicated with x's in FIG. 7. The interpolated values found at these sampling locations make up the 4 rows and 4 columns of the lower resolution base image level $103_{n+1}$. Notice that the span of the lower resolution base image level $103_{n+1}$ is larger than that of the base image level $103_n$.

Figure 8:
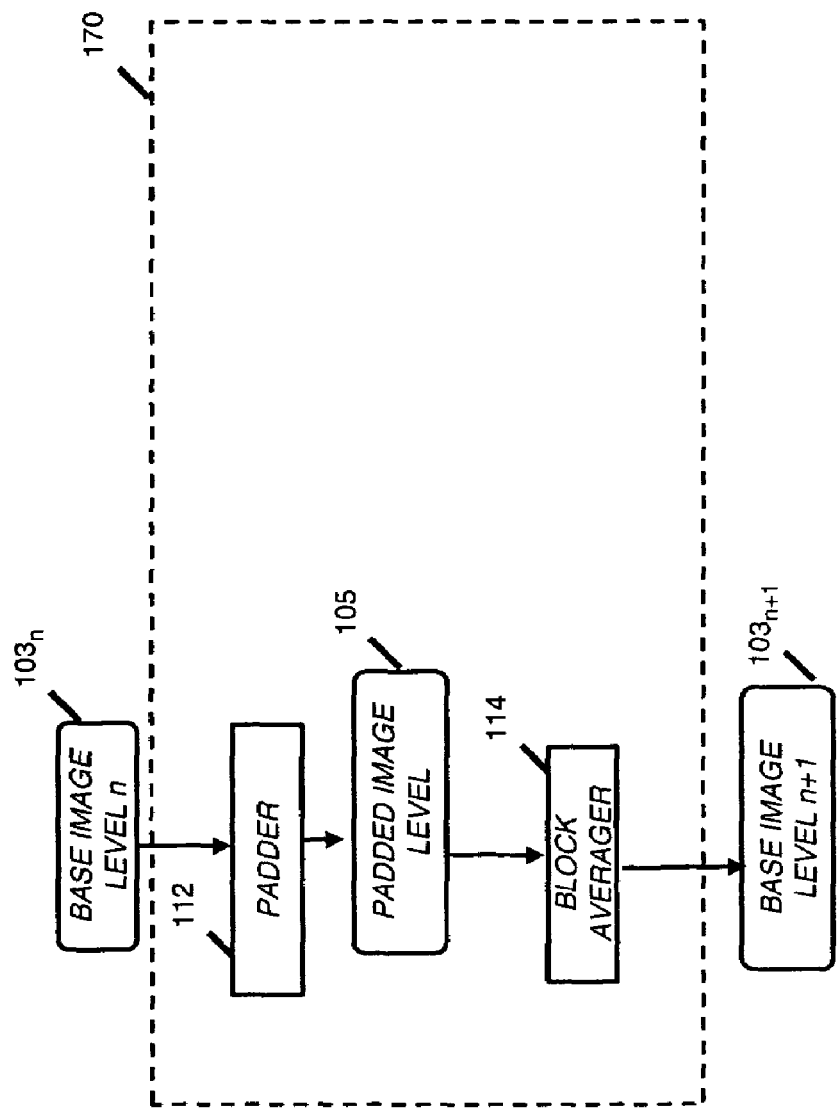
FIG. 8 is a block diagram of an illustrative down sampler, shown in FIG. 6.

The operation of the down sampler 170 can be described in another fashion, as shown in FIG. 8, which aids in understanding but is substantially less efficient. A border of at least int(Q/2) pixels is circumscribed about the base image level $103_n$ by chroma control signal generator 112. When Q is even and Q is not able to be evenly divided into $X_0$, then extra rows are added (after the $X_0^{th}$ row). A similar procedure is executed for the columns. The values of the border pixels are determined through mirroring (see Eq. (9)). This results in a padded base image level 105 having a number or rows and columns evenly divisible by Q. The filtering and decimation is then applied to padded base image level 105 with the block averager 114. For example, when Q=2, block averaging with a 2×2 block is performed in the padded base image level 105$_n$ to generate the lower resolution base image level 103$_{n+1}$.

As before, the lower resolution base image level 103$_{n+1}$ has int$((X_0+1)/2)+1$ rows and int$((Y_0+1)/2)+1$ columns. The border is added so that the span of the lower resolution base image level will be at least as large as the span of the base image level 103$_n$. If the span of the lower resolution base image level is smaller than the base image level, then information is lost for that and subsequent pyramid levels. This causes a deleterious effect to the resulting image when the residual images 104 are modified and cannot compensate for the lost information.

The output of the down sampler 170 is the base image level n+1 103$_{n+1}$, which is also an output of the pyramid level module 115. In the process of generating the reduced resolution base image level 103$_{n+1}$, highpass information is discarded. The residual signal contains the discarded highpass information such that the base image level 103$_{n+1}$ and the residual image 104$_{n+1}$ can be combined to form the base image level 103$_n$. To produce the residual image 104$_{n+1}$, the base image level 103$_{n+1}$ output from the down sampler 170 is passed to an interpolator 172 for interpolation by the factor Q. Preferably, the interpolator 172 performs a standard bilinear interpolation by a factor of two. The preferred bilinear interpolation is such that the phase of the interpolated image is that same as that of the base image level 103$_n$. The output of the interpolator 172 is the interpolated base image level 174.

The interpolated base image level 174 has the same number of rows and columns of pixels as the base image level 103$_n$. Let $I_{B0}(x_0,y_0)$ represent the pixel values of the interpolated base image level 174 where $x_0$ is an integer over the range from 0 to $X_0-1$, and $y_0$ is an integer ranging from 0 to $Y_0-1$. The operation of the interpolator 172 can be thought of as finding the values of $I_{B0}(x_0,y_0)$ based on the values of $I_1(x_1, y_1)$. This is accomplished with the following steps:

A. The pixel locations $(x_0,y_0)$ of the interpolated base image level 174 are mapped to locations $(\tilde{x}_1,\tilde{y}_1)$ in the lower resolution base image level 103$_{n+1}$. Typically, $(\tilde{x}_1,\tilde{y}_1)$ will not correspond to an exact integer location, but will fall between pixel sites.

Preferably, the mapping is given as:

$$\tilde{x}_1 = \frac{x_0}{Q} + \text{offset } 2 \qquad (10)$$

$$\tilde{y}_1 = \frac{y_0}{Q} + \text{offset } 2$$

Q is an integer that indicates the distance between samples in the base image level 103n, in terms of the interpolated base image level 174.

Preferably, offset2=0 when Q is odd and offset2=½ Q when Q is even.

B. Interpolation is again performed to find the value of $I_{B0}(x_0,y_0)$.

Preferably, $$I_{B0}(x_0, y_0) = \sum_{\substack{i=-\infty \\ j=-\infty}}^{+\infty} f_d(i, j) I_1(\tilde{x}_1 - i, \tilde{y}_1 - j) \qquad (11)$$

The preferred filter $f_d$ is given in Eq. (8). When Eq. (11) is used, the values of $I_{B0}(x_0,y_0)$ are found with bilinear interpolation. In the preferred case where Q=2, the weights on the pixel values of the lower resolution base image $I_1(x_1,y_1)$ are always either 9/16, 3/16, or 1/16.

Using the preferred parameters, the interpolator never needs to perform mirroring, since the integer values of the indices of $I_1(\tilde{x}_1-i, \tilde{y}_1-j)$ are always within the range of 0 to $X_0-1$ for the row index and 0 to $Y_1-1$ for the column index. This is a direct result that in the operation of the preferred down sampler 170 the span of the low resolution base image level 103$_{n+1}$ is at least as large as the span of base image level 103$_n$.

The interpolated base image level 174 is input to the differencer 176. The differencer 176 calculates the residual image 104$_{n+1}$ by subtracting the interpolated base image level 174 from the base image level 103$_n$, according to the equation:

$$r(x,y)=b(x,y)-bi(x,y) \qquad (12)$$

where:
r(x,y) represents the value of the pixel of the residual image 104$_{n+1}$ at the (x,y) location,
b(x,y) represents the value of the $n^{th}$ base image level 103$_n$ at the (x,y) location, and
bi(x,y) represents the value of the interpolated base image level 174 at the (x,y) location.

From the previous equation, it is easy to see that the base digital image 103$_n$ can be formed from the base digital image 103$_{n+1}$ and the residual images 104$_{n+1}$ through a reconstruction process. The process includes the steps of interpolating the base digital image 103$_{n+1}$, then adding the residual digital image 104$_{n+1}$. By extension, the digital image 164 shown in FIG. 5 can be represented as a collection of residual images 104$_{1-N}$ and one base digital image 103$_N$. The perfect reconstruction of the digital image 164 is an iterative process where one base digital image and the corresponding residual image are used to create a higher resolution base digital image, which in turn is used with the next residual digital image to create an even higher resolution base digital image. In the preferred embodiment, N=8 pyramid levels are used in the pyramid representation. Perfect reconstruction of an image pyramid is well known.

Figure 9:
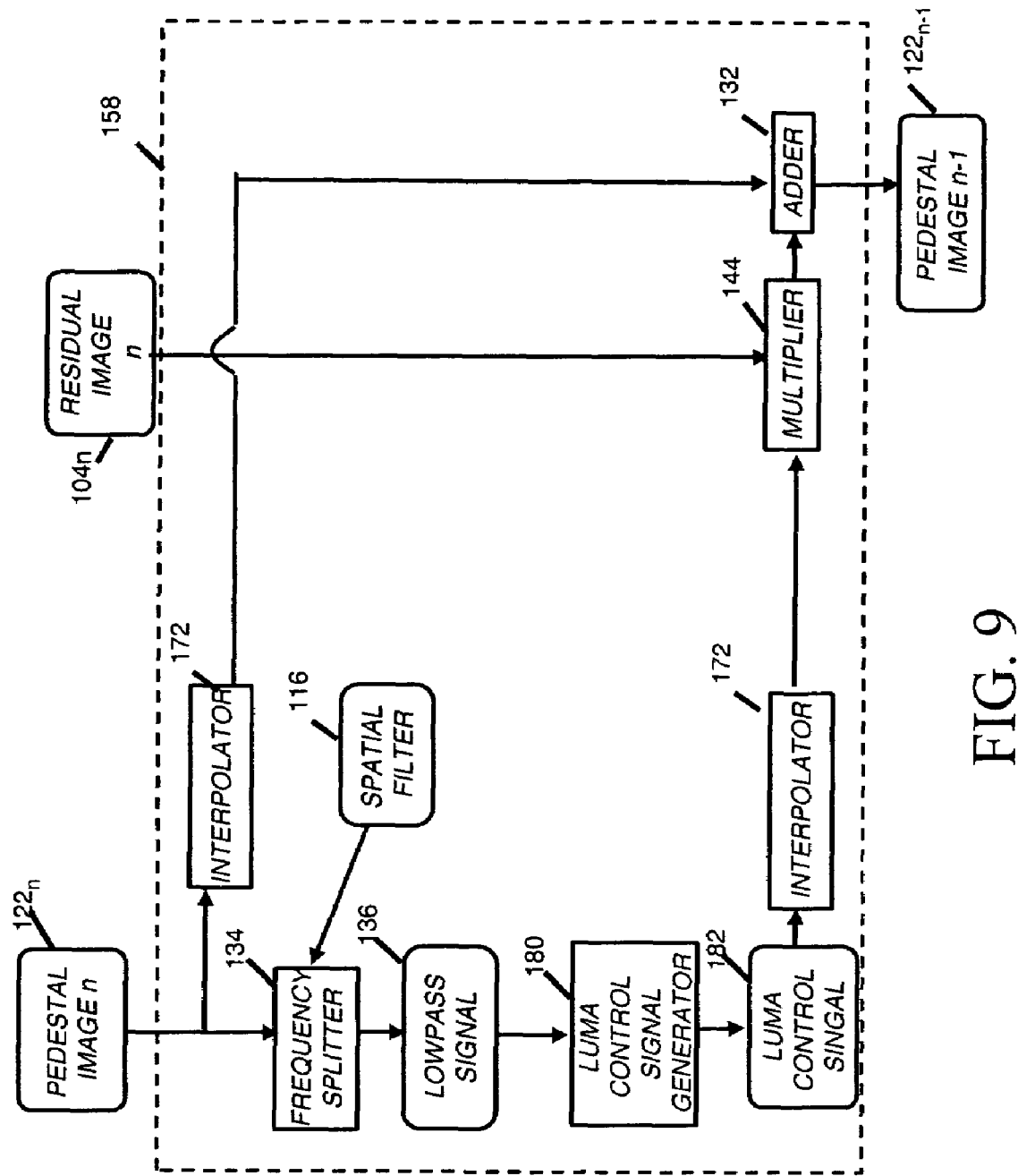
FIG. 9 is a block diagram of one iteration of the pedestal reconstructor shown in FIG. 4.

An alternative of one iteration of the pedestal reconstructor 158 of FIG. 4 is shown in greater detail in FIG. 9. Referring again to FIG. 9, the pedestal signal n 122$_n$ is input to a frequency splitter 134. The frequency splitter 134 applies a spatial filter 116 to the pedestal signal, generating the lowpass signal 136. The spatial filter 116 is lowpass in nature, attenuating any high frequency content in the pedestal signal 122$_n$.

The lowpass signal 136 is input to the luma control signal generator 180 for generating the luma control signal 182. The luma control signal 182 has a value near 1.0 corresponding to "edge" regions in luminance digital image 107, and a value near 0 for other regions, with intermediate values.

The luma control signal 182 is interpolated by a factor Q by an interpolator 172, and multiplied by the residual image 104$_n$ by a multiplier 144, resulting in a signal that is zero in non-edge regions and maintains the values of the residual image $104_n$ in edge regions. The resulting signal is added with an adder 132 to the signal resulting from interpolating with an interpolator 172 the pedestal signal n, forming the pedestal signal $122_{n-1}$. Thus, the pedestal signal $122_{n-1}$ is simply an interpolated version of the pedestal signal n, with the addition of residual image $104_n$ content in edge regions.

FIG. 9 illustrates the pedestal level reconstructor 158 for creating a higher resolution pedestal signal 122 from a starting pedestal signal. By iterating this pedestal level reconstructor, a pedestal signal 122 can be generated from the pyramid image representation 108 of FIG. 4. In the preferred embodiment, the pyramid image representation 108 has 8 levels.

Figure 10:
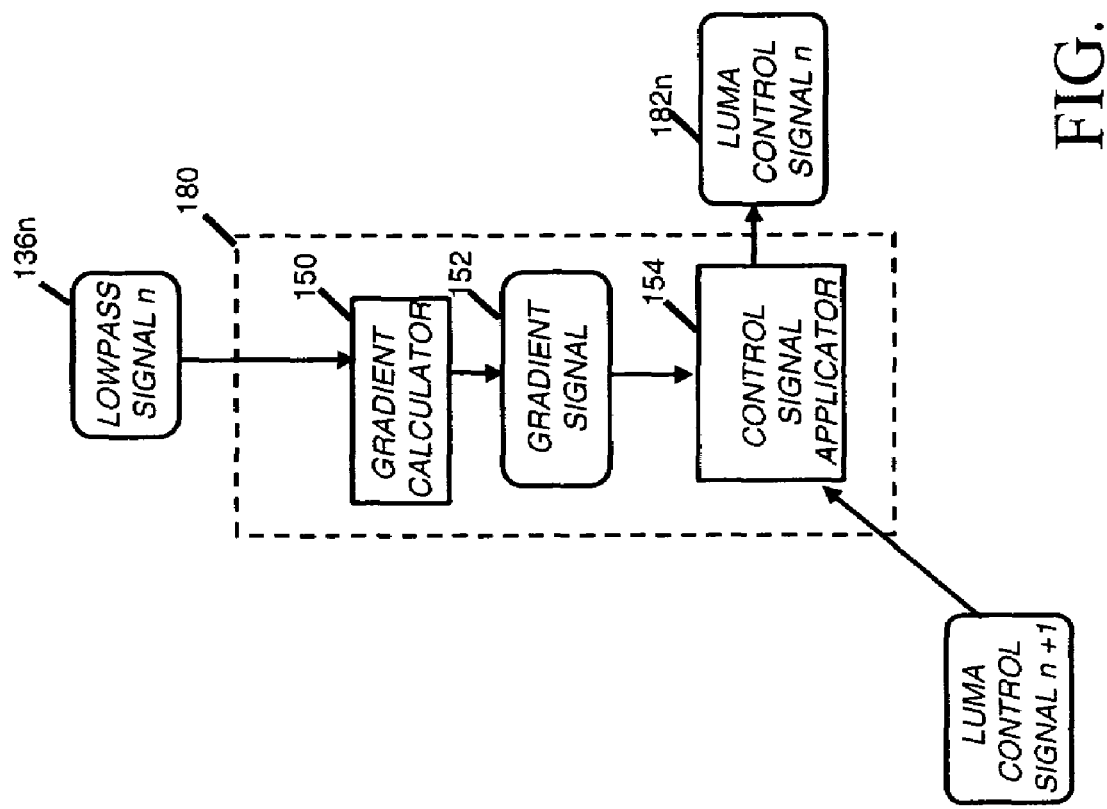
FIG. 10 is a block diagram of the luma control signal generator shown in FIG. 9.

FIG. 10 illustrates the luma control signal generator 180 that is used to create the luma control signal 182 for use in generating the pedestal signal when reconstructing an image pyramid representation, as shown in FIG. 9. In accordance with FIG. 9, a luma control signal $182_n$ is generated for each of the resolution levels during the pedestal reconstruction.

First, the non-directional gradient G of the lowpass signal 136 is calculated by the gradient calculator 150 and output as the gradient signal 152. This calculation is performed by calculating vertical and horizontal gradients with a spatial filter called a gradient filter.

Although a variety of different gradient filters can be used, the preferred embodiment of the present invention uses two Prewitt spatial filters to generate a vertical and a horizontal gradient value for each input pixel value given by Eq. (13) and (14)

$$\begin{matrix} -1 & 0 & 1 \\ -1 & 0 & 1 \\ -1 & 0 & 1 \end{matrix} \quad (13)$$

$$\begin{matrix} -1 & -1 & -1 \\ 0 & 0 & 0 \\ 1 & 1 & 1 \end{matrix} \quad (14)$$

respectively.

The non-directional gradient signal 152 is the square root of the sum of the squares of these two gradients. The control signal applicator 154 inputs the gradient signal 152 the chroma control signal $114_n$, and optionally the luma control signal $182_{n+1}$ (the luma control signal previously calculated from the previous lower resolution) and produces the luma control signal $182_n$. The values of the luma control signal $182_n$ are in the range of 0 to 1, and are found by applying a gradient threshold that is dependent on both the value of the chroma control signal $114_n$ and the luma control signal $182_{n+1}$ to the gradient signal 152. The luma control signal $182_n$ has a value of 1.0 corresponding to "edge" regions and a value of 0.0 corresponding to "detail" regions in the original digital image and intermediate values for regions that are not easily classified as "edge" or "detail." The classification of "edge" is more difficult to attain (i.e. the gradient signal requirement is increased) in the luma control signal $182_n$ where the corresponding location in the previous resolution luma control signal $182_{n+1}$ was not classified as an "edge" (i.e. the pixel value was not 1.0). The operation of the control signal applicator 154 can be expressed as an equation:

$$Lc(x, y) = \begin{cases} 1 & \text{when} & G(x, y) < p \\ 0 & \text{when} & G(x, y) > 2p \\ 1.0 - \dfrac{G(x, y) - p}{p} & \text{otherwise} \end{cases} \quad (15)$$

where
Lc(x,y) is the value of the luma control signal 182 at the (x,y) location;
G(x,y) is the value of the gradient signal 152 at the (x,y) location;
p is a gradient threshold value that is dependent on the value of the luma control signal n+1 $182_{n+1}$ and is preferably:

$$p(x, y) = \begin{cases} \max(0, f) + h(g - Lo(xx, yy)) & \text{when} & Lo(xx, yy) < g \\ \max(0, f) & \text{otherwise} \end{cases} \quad (16)$$

where:
f is an arbitrary constant, preferably 68;
h is an arbitrary constant, preferably 1.4;
g is an arbitrary constant, preferably 0.4; and
Lo(xx,yy) is the value of the luma control signal n+1 at the location (xx,yy) that corresponds to the location (x,y) in the current resolution level n.

When Q=2, the value of xx=(x−½)/2 for example. The value of the luma control signal Lo(xx,yy) must be found by interpolation (preferably bilinear interpolation) when either xx or yy is not an integer. All other variables have been previously defined.

The present invention can be employed with any number of pyramid levels. Noise in images is generally a function of spatial resolution and is also more objectionable for the higher spatial resolution pyramid levels. The optimal number of pyramid levels depends on the texture removal goals of the digital imaging system designer and on the size of the digital images being processed. The preferred embodiment of the present invention uses 8 pyramid levels for effective texture and noise removal for digital images of size 1024 by 1536 pixels. For processing digital images of greater spatial resolution, such as 2048 by 3072 pixel, 9 pyramid levels are used. For processing digital images of lower spatial resolution, such as 512 by 768 pixels, 7 pyramid levels are used.

Rather than constructing the image pyramid with a predetermined number of pyramid levels as described above, pyramid levels can be produced until a predetermined criteria is met. For example, pyramid levels can be produced until both image dimensions (number of rows and columns of pixels) are below 16 in the lower resolution base image level $103_{n+1}$.

The method of the present invention can be performed in a digital camera or in a digital printer.

The invention has been described in detail with particular reference to certain preferred embodiments thereof, but it will be understood that variations and modifications can be effected within the spirit and scope of the invention.

PARTS LIST 10 image capture device
20 digital image processor
30 image output device
40 general control computer 50 display device
60 input control device
70 offline memory device
101 original digital image
102 enhanced digital image
$103_{1-N}$ base image level
$104_{1-N}$ residual image
105 padded base image level
107 luminance digital image
108 image pyramid representation
109 chrominance digital image
112 chroma control signal generator
113 enhanced luminance digital image
114 chroma control signal
$115_{1-N}$ pyramid level module
116 spatial filter
120 pedestal generator
$122_{0-N}$ pedestal image
124 tone scale function applicator
126 modified pedestal image
128 texture generator
130 texture image
132 adder
134 frequency splitter
136 lowpass signal
144 multiplier
150 gradient calculator
152 gradient signal
154 control signal applicator
156 pyramid constructor
158 pedestal reconstructor
164 digital image
170 down sampler
172 interpolator
174 interpolated base image level
176 differencer
180 luma control signal generator
182 luma control signal
203 tone scale function
210 LCC conversion module
220 RGB conversion module
230 tone scale function generator
240 luminance enhancer

What is claimed is:

1. A method of processing a digital image with a computer having a digital image processing function to form an image pyramid having a first to a Nth number of pyramid image levels from a luminance image obtained from the digital image, the Nth number corresponding to a predetermined number of pyramid image levels or a number reached when a predetermined condition is met, the method comprising the steps of:

a) generating a first level base image comprising pixel values at pixel locations arranged in rows and columns based on an initial level base image, which is the luminance image obtained from the digital image, the first level base image having a smaller resolution than the initial level base image;

b) generating a next level base image by:
determining sample locations for the next level base image in the pyramid based solely on the previous level base image without adding a border around the previous level base image, such that the sample locations are arranged in a regular pattern and the sample locations both span an entire range of and beyond the pixel locations of the previous level base image but with the next level base image having a smaller resolution than the previous level base level image;
determining the pixel values of the next level base image by interpolating the pixel values of the previous level base image using an interpolation filter at the determined sample locations, wherein the interpolation filter is configured to interpolate between pixel values nearby the determined sample locations, and wherein mirroring is used for sample locations within the determined sample locations (1) whose pixel values are to be interpolated and (2) whose locations are outside of the range of the pixel locations of the previous level base image;

c) generating a subsequent level base image to an Nth level base image by repeating step b) until the Nth number of pyramid image levels are generated.

2. The method claimed in claim 1, further comprising wherein the pyramid image includes residual images, which are formed by the steps of:

d) generating a first level residual image having the same resolution as the initial level base image by interpolating the first level base image to have the same resolution as the initial level base image, and calculating the difference between the initial level base image and the interpolated first level base image;

e) generating a next level residual image having the same resolution as the previous level base image by interpolating the next level base image to have the same resolution as the previous level base image, and calculating the difference between the previous level base image and the interpolated next level base image; and f) generating a subsequent level residual image to an Nth level residual image by repeating step e) until the Nth level residual image is generated.

3. The method claimed in claim 1, wherein the determined sample locations preserve the phase of the initial base level image.

4. The method claimed in claim 1, wherein the interpolation filter is a block average filter.

5. The method claimed in claim 1, wherein interpolation filter employs reflected pixel values at the edges of the digital image.

6. A method of processing a digital image to form an enhanced luminance image from a luminance image obtained from the digital image, with a computer having a digital image processing function, the method comprising the steps of:

a) generating an image pyramid, having a first to a Nth number of pyramid image levels from the luminance image obtained from the digital image, the Nth number corresponding to a predetermined number of pyramid image levels or a number reached when a predetermined condition is met, by:

i) generating a first level base image comprising pixel values at pixel locations arranged in rows and columns based on an initial level base image, which is the luminance image, the first level base image having a smaller resolution than the initial level base image;

ii) generating a first level residual image having the same resolution as the initial level base image by interpolating the first level base image to have the same resolution as the initial level base image, and calculating the difference between the initial level base image and the interpolated first level base image;

iii) forming a next level base image by:
determining sample locations for the next base level image in the pyramid based solely on the previous level base image without adding a border wound the previous level base image, such that the sample locations are arranged in a regular pattern and the sample locations both span an entire range of and beyond the pixel locations of the previous level base image but with the next level base image having a smaller resolution than the previous level base image;

determining the pixel values of the next level base image by interpolating the pixel values of the previous level base image using an interpolation filter at the determined sample locations, wherein the interpolation filter is configured to interpolate between pixel values nearby the determined sample locations, and wherein mirroring is used for sample locations within the determined sample locations (1) whose pixel values are to be interpolated and (2) whose locations are outside of the range of the pixel locations of the previous level base image;

iv) generating a next level residual image having the same resolution as the previous level base image by interpolating the next level base image to have the same resolution as the previous level base image and calculating the difference between the previous level base image and the interpolated next level base image; and v) generating a subsequent level base image and a subsequent level residual image, and higher by repeating steps iii) and iv) until Nth level base and residual images are generated; and b) generating a pedestal image from the image pyramid obtained in step a) above;

c) applying a tone scale function to the pedestal image generated in step b) to produce a tone scale adjusted pedestal image;

d) generating a texture image from the luminance image and the generated pedestal image;

e) adding the texture image obtained in step d) to the tone scale adjusted pedestal image produced in step c) to produce an enhanced luminance image.

7. The method claimed in claim 6, wherein the step of generating the pedestal image comprises the steps of:

modifying the generated residual images to reduce the magnitude thereof in regions corresponding to non-edge regions of the initial level base image to produce modified residual images;

generating the pedestal image by reconstructing the digital image using the modified residual images.

8. The method claimed in claim 6, wherein the sample locations preserve the phase of the initial level base image.

9. The method claimed in claim 6, wherein the interpolation filter employs reflected pixel values at the edges of the digital image.

10. An apparatus for processing a digital image to form an image pyramid having a first to a Nth number of pyramid image levels from a luminance image obtained from the digital image, the apparatus comprising a computer readable storage medium having stored thereon a computer program product configured to:

a) generate a first level base image comprising pixel values at pixel locations arranged in rows and columns based on an initial level base image, which is the luminance image, the first level base image having a smaller resolution than the initial level base image;

b) generate a second level base image by:

i) determining sample locations for the second level base image in the pyramid based solely on the base level image without adding a border around the first level base image, such that the sample locations are arranged in a regular pattern and the sample locations both span an entire range of and beyond the pixel locations of the first level base image but with the second level base image having a smaller resolution than the first level base level image;

ii) determining the pixel values of the second level base image by interpolating the pixel values of the first level base image using an interpolation filter at the determined sample locations, wherein the interpolation filter is configured to interpolate between pixel values nearby the determined sample locations, and wherein mirroring is used for sample locations within the determined sample locations (1) whose pixel values are to be interpolated and (2) whose locations outside of the range of the pixel locations of the first level base image; and c) generate a subsequent base level image to an Nth base level image.

11. The apparatus claimed in claim 10, wherein the pyramid image includes residual images, the computer program product further being configured to:

generate a first level residual image having the same resolution as the initial level base image by interpolating a the first level base image to have the same resolution as the initial level base image, and calculating the difference between the initial level base image and the interpolated first level base image;

generate a second level residual image having the same resolution as the first level base image by interpolating the second level base image to have the same resolution as the first level base image, and calculating the difference between the first level base image and the interpolated second level base image; and generate a subsequent level residual image to a Nth level residual image.

12. The apparatus claimed in claim 10, wherein the determined sample locations preserve the phase of the initial level base image.

13. The apparatus claimed in claim 10, wherein the interpolation filter is a block average filter 14. The apparatus claimed in claim 10, wherein the interpolation filter employs reflected pixel values at the edges of the digital image.

15. An apparatus for processing a digital image to form an enhanced luminance image from a luminance image obtained from the digital image, the apparatus comprising a computer readable storage medium having stored thereon a computer program product configured to:

a) generate an image pyramid having a first to a Nth number of pyramid image levels from the luminance image obtained from the digital image, the Nth number corresponding to a predetermined number of pyramid image levels or a number reached when a predetermined condition is met, the image pyramid being generated by;

i) generating a first level base image comprising pixel values at pixel locations arranged in rows and columns based on an initial level base image, which is the luminance image, the first level base image having a smaller resolution than the initial level base image;

ii) generating a first level residual image having the same resolution as the initial level base image by interpolating a the first level base image to have the same resolution as the initial level base image, and calculating the difference between the initial level base image and the interpolated first level base image;

iii) generating a second level base image by:

determining sample locations for the second level base image in the pyramid based solely on the first level base image without adding a border around the first level base image, such that the sample locations are arranged in a regular pattern and the sample locations both span an entire range of and beyond the pixel locations of the first level base image but with the second level base image having a smaller resolution than the first level base level image; and determining the pixel values of the second level base image by interpolating the pixel values of the first level base image using an interpolation filter at the determined sample locations, wherein the interpolation filter is configured to interpolate between pixel values nearby the determined sample locations, and wherein mirroring is used for sample locations within the determined sample locations (1) whose pixel values are to be interpolated and (2) whose locations are outside of the range of the pixel locations of the first level base image;

iv) generating a second level residual image having the same resolution as the first level base image by interpolating the second level base image to have the same resolution as the first level base image, and calculating the difference between the first level base image and the interpolated second level base image;

v) generating a subsequent level base image to a Nth level base image; and vi) generating a subsequent level residual image to a Nth level residual image;

b) generate a pedestal image from the generated image pyramid;

c) apply a tone scale function to the generated pedestal image to produce a tone scale adjusted pedestal image;

d) generate a texture image from the luminance image and the generated pedestal image; and e) add the generated texture image to the tone scale adjusted pedestal image to produce an enhanced luminance image.

16. The apparatus claimed in claim 15, wherein the process of generating the pedestal image comprises:

modifying the generated residual images to reduce the magnitude thereof in regions corresponding to non-edge regions of the initial level base image to produce modified residual images; and generating the pedestal image by reconstructing the digital image using the modified residual images.

17. The apparatus claimed in claim 15, wherein the determined sample locations preserve the phase of the initial level base image.

18. The apparatus claimed in claim 15, wherein interpolation filter employs reflected pixel values at the edges of the digital image.

19. A computer readable medium having stored thereon a computer program product for performing the method of claim 1.

20. A computer readable medium having stored thereon a computer program product for performing the method of claim 6.

* * * * *

UNITED STATES PATENT AND TRADEMARK OFFICE
CERTIFICATE OF CORRECTION

PATENT NO. : 7,672,528 B2  Page 1 of 1
APPLICATION NO. : 10/607401
DATED : March 2, 2010
INVENTOR(S) : Andrew C. Gallagher et al.

It is certified that error appears in the above-identified patent and that said Letters Patent is hereby corrected as shown below:

| Issued Patent | | Description of Error |
|---|---|---|
| Column | Line | |
| 16 | 2 | In Claim 1, delete "image;" and insert -- image; and -- |
| 16 | 17 | In Claim 2, after "1," delete "further comprising" |
| 17 | 1 | In Claim 6, delete "wound" and insert -- around -- |
| 17 | 8 | In Claim 6, delete "image;" and insert -- image; and -- |
| 17 | 38 (Approx.) | In Claim 6, delete "image;" and insert -- image; and -- |
| 17 | 48 (Approx.) | In Claim 7, delete "images;" and insert -- images; and -- |
| 18 | 9 | In Claim 10, delete "image;" and insert -- image; and -- |
| 18 | 27-28 | In Claim 11, delete "a the" and insert -- the -- |
| 18 | 44 | In Claim 13, delete "filter" and insert -- filter. -- |
| 18 | 58 | In Claim 15, delete "by;" and insert -- by: -- |
| 18 | 66 | In Claim 15, delete "a the" and insert -- the -- |

Signed and Sealed this

Ninth Day of November, 2010

David J. Kappos
*Director of the United States Patent and Trademark Office*